United States Patent
Eifes et al.

(10) Patent No.: US 12,064,046 B2
(45) Date of Patent: Aug. 20, 2024

(54) SLEEVE FOR A WATER BOTTLE

(71) Applicant: SAFETY NAILER LLC, Yorktown, VA (US)

(72) Inventors: Kristen Eifes, Yorktown, VA (US); Daniel Eifes, Yorktown, VA (US); Cori Zirkle, Virginia Beach, VA (US); Drew Zirkle, Virginia Beach, VA (US)

(73) Assignee: SAFETY NAILER LLC, Yorktown, VA (US)

( * ) Notice: Subject to any disclaimer, the term of this patent is extended or adjusted under 35 U.S.C. 154(b) by 0 days.

(21) Appl. No.: 17/688,323

(22) Filed: Mar. 7, 2022

(65) Prior Publication Data
US 2022/0287491 A1    Sep. 15, 2022

Related U.S. Application Data

(60) Provisional application No. 63/159,131, filed on Mar. 10, 2021.

(51) Int. Cl.
| | | |
|---|---|---|
| *A45F 5/00* | (2006.01) |
| *A45F 3/18* | (2006.01) |
| *A47G 23/02* | (2006.01) |
| *B29C 45/14* | (2006.01) |
| *B65D 25/22* | (2006.01) |
| *A45F 3/00* | (2006.01) |
| *B29K 83/00* | (2006.01) |

(52) U.S. Cl.
CPC ............ *A47G 23/0241* (2013.01); *A45F 3/18* (2013.01); *B29C 45/14* (2013.01); *A45F 2003/001* (2013.01); *A45F 2003/003* (2013.01); *B29K 2083/00* (2013.01)

(58) Field of Classification Search
CPC .............. A45F 3/18; A45F 2003/001; A45F 2003/003; A45F 5/00; A47G 23/0241; A47G 23/02; A47G 2023/0291; A47G 2023/0216; B29C 45/14; B29K 2083/00; A45C 2200/20; B65D 23/0871; B65D 23/0892; B65D 51/242; B65D 81/3876
USPC .......... 215/390, 395, 11.6, 901.4; 224/148.6, 224/148.7, 250; 220/62.12, 737; 294/150, 157, 152, 149; D3/229, 106, D3/316; D7/624.2, 607, 396.4
See application file for complete search history.

(56) References Cited

U.S. PATENT DOCUMENTS

| | | | | |
|---|---|---|---|---|
| 1,188,904 | A * | 6/1916 | Cosgriff | A47J 41/02 |
| | | | | 248/102 |
| 2,706,571 | A * | 4/1955 | Ryan | A61J 9/08 |
| | | | | 215/11.6 |
| 2,809,760 | A * | 10/1957 | Clark | A61J 9/08 |
| | | | | 248/302 |

(Continued)

*Primary Examiner* — Gideon R Weinerth
(74) *Attorney, Agent, or Firm* — CANTOR COLBURN LLP

(57) ABSTRACT

A sleeve for a water bottle and a method of making a sleeve is provided. The sleeve comprising a bottle holder portion having a first plurality of elastic straps arranged to define a cylindrical center portion. The cylindrical portion has an open first end, and a second end at least partially enclosed by a second plurality of elastic straps, the open first end being sized to receive the water bottle. At least one first storage portion is provided having a third plurality of elastic straps, at least a portion of the third plurality of elastic straps extending from the first plurality of elastic straps.

18 Claims, 10 Drawing Sheets

(56) References Cited

U.S. PATENT DOCUMENTS

| | | | | |
|---|---|---|---|---|
| 2,934,122 | A * | 4/1960 | Lindsey | A45F 3/16 383/102 |
| D227,043 | S * | 5/1973 | Van Den Berg | D3/202 |
| 4,248,366 | A * | 2/1981 | Christiansen | A45F 5/00 220/903 |
| 4,972,964 | A * | 11/1990 | Escalante | A47G 23/0241 215/396 |
| D350,024 | S * | 8/1994 | Ryker | D3/202 |
| 5,806,730 | A * | 9/1998 | Deno | B62J 11/04 224/579 |
| 6,401,993 | B1 * | 6/2002 | Andrino | A45F 5/00 D3/229 |
| D618,065 | S * | 6/2010 | Joy | D7/624.2 |
| D621,259 | S * | 8/2010 | Joy | D9/444 |
| D630,429 | S * | 1/2011 | Reyes | D3/229 |
| D635,685 | S * | 4/2011 | Hendricks | D24/199 |
| 8,282,518 | B2 * | 10/2012 | Silverglate | A61J 17/1111 606/236 |
| D682,544 | S * | 5/2013 | Raich | D3/229 |
| 9,027,806 | B1 * | 5/2015 | Gioggia | A45F 5/02 224/269 |
| D766,570 | S * | 9/2016 | Kao | D3/229 |
| D772,021 | S * | 11/2016 | Joy | D7/624.2 |
| D773,800 | S * | 12/2016 | Willows | D3/202 |
| D781,113 | S * | 3/2017 | Kocsis | D7/624.2 |
| D850,261 | S * | 6/2019 | Stewart | D9/455 |
| 10,369,915 | B1 * | 8/2019 | Haynes | A47C 7/622 |
| D889,914 | S * | 7/2020 | Wadsworth | D3/229 |
| D889,915 | S * | 7/2020 | Wadsworth | D3/229 |
| D904,130 | S * | 12/2020 | Myers | D7/624.2 |
| D906,055 | S * | 12/2020 | McCabe | D7/624.2 |
| D925,995 | S * | 7/2021 | Wang | D3/229 |
| D935,630 | S * | 11/2021 | Lane | D24/199 |
| D981,800 | S * | 3/2023 | Huang | D3/202 |
| D984,904 | S * | 5/2023 | Gan | D9/711 |
| D991,032 | S * | 7/2023 | Shi | D3/229 |
| 11,753,209 | B1 * | 9/2023 | Parry | B65D 23/14 215/395 |
| D1,007,248 | S * | 12/2023 | Jin | D3/202 |
| 2011/0132507 | A1 * | 6/2011 | Reyes | A45F 3/02 150/112 |
| 2013/0098954 | A1 * | 4/2013 | Inglis | A45F 5/00 224/148.4 |
| 2014/0034660 | A1 * | 2/2014 | Marcus | B65D 23/0871 220/737 |
| 2014/0312082 | A1 * | 10/2014 | Scribner | A45C 13/30 224/148.6 |
| 2015/0250684 | A1 * | 9/2015 | Cross | A61J 9/06 206/459.1 |
| 2015/0265083 | A1 * | 9/2015 | Myers | A45F 5/10 220/737 |
| 2016/0214784 | A1 * | 7/2016 | Caldwell | A45C 11/20 |
| 2019/0055060 | A1 * | 2/2019 | Mouneimne | B65D 51/242 |
| 2020/0085177 | A1 * | 3/2020 | Walk | A45C 3/001 |
| 2020/0385190 | A1 * | 12/2020 | Maurizio | B65D 81/022 |
| 2021/0130040 | B1 * | 5/2021 | Sanders | D04B 21/20 |
| 2022/0287491 | A1 * | 9/2022 | Eifes | A45F 3/18 |
| 2022/0400836 | A1 * | 12/2022 | Western | A45F 3/02 |

* cited by examiner

SLEEVE FOR A WATER BOTTLE

CROSS REFERENCE TO RELATED APPLICATIONS

This application claims the benefit of U.S. Provisional Application Ser. No. 63/159,131, filed Mar. 10, 2021, the entire disclosure of which is incorporated herein by reference.

BACKGROUND

The subject matter disclosed herein relates to a sleeve or holder for a water bottle and in particular to a sleeve having one or more holding features for storing personal items.

Water bottles are generally a cylindrical container made from either plastic or glass and have an opening on one end. A cover is typically removably coupled to the opening to avoid having the liquid contained in the bottle from splashing out. The cover may include an element that allows the operator to drink from the bottle without removing the cover.

Water bottles are commonly carried by a user either by holding on to the outer diameter of the cylindrical container, or by a strap or other device (e.g. a ring or carabiner). Due to the generally smooth surface of the container, sleeves made from silicone have been marketed to put around the outside of the container. The silicone is elastic and grips the container tightly and also helps the user to firmly hold the water bottle. Where the container is made from glass, the silicone sleeve may help prevent breakage or damage to the water bottle.

One common activity where users bring water bottles is to the gym. The water bottle, along with the user's keys, wallet, or cell phone are carried from station to station within the gym while the user performs their exercise. Each of the items must be collected prior to the user moving from one exercise station to the next.

Accordingly, while existing water bottles and silicone sleeves are suitable for their intended purposes the need for improvement remains, particularly in providing a sleeve for a water bottle having the features described herein.

BRIEF DESCRIPTION

According to one aspect of the disclosure a sleeve for a water bottle is provided. The sleeve comprising a bottle holder portion having a first plurality of elastic straps arranged to define a cylindrical center portion. The cylindrical portion has an open first end, and a second end at least partially enclosed by a second plurality of elastic straps, the open first end being sized to receive the water bottle. At least one first storage portion is provided having a third plurality of elastic straps, at least a portion of the third plurality of elastic straps extending from the first plurality of elastic straps.

According to another aspect of the disclosure a method of making a sleeve for a water bottle is provided. The method comprises: providing a base mold for an injection molding machines, the base mold being shaped to form a bottle holder portion and at least one first storage portion, the bottle holder portion having a first plurality of elastic straps arranged to define a cylindrical center portion, the cylindrical portion having an open first end, and a second end at least partially enclosed by a second plurality of elastic straps, the open first end being sized to receive the water bottle, and the at least one first storage portion having a third plurality of elastic straps, at least a portion of the third plurality of elastic straps extending from the first plurality of elastic straps; selecting from a plurality of inserts a first insert configured to removably couple with the base mold, the first insert being shaped to form a logo portion in the bottle holder portion; inserting the first insert into the base mold; and forming the sleeve using the base mold and the first insert These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION

Embodiments of the present disclosure provide for a sleeve for a water bottle and a method of manufacturing the sleeve. Embodiment herein provide for a sleeve having at least one storage portion. Further embodiments herein provide for a plurality of storage portions each sized to receive an article. In one or more embodiments the storage portions may be sized to receive a cellular telephone, a wallet, or keys. Embodiments of the present disclosure provides advantages in allowing a user to keep common articles, such as but not limited to cellular phones, wallets, and keys for example, securely stored while the user is performing an activity, such as but not limited to exercising.

Figure 9:
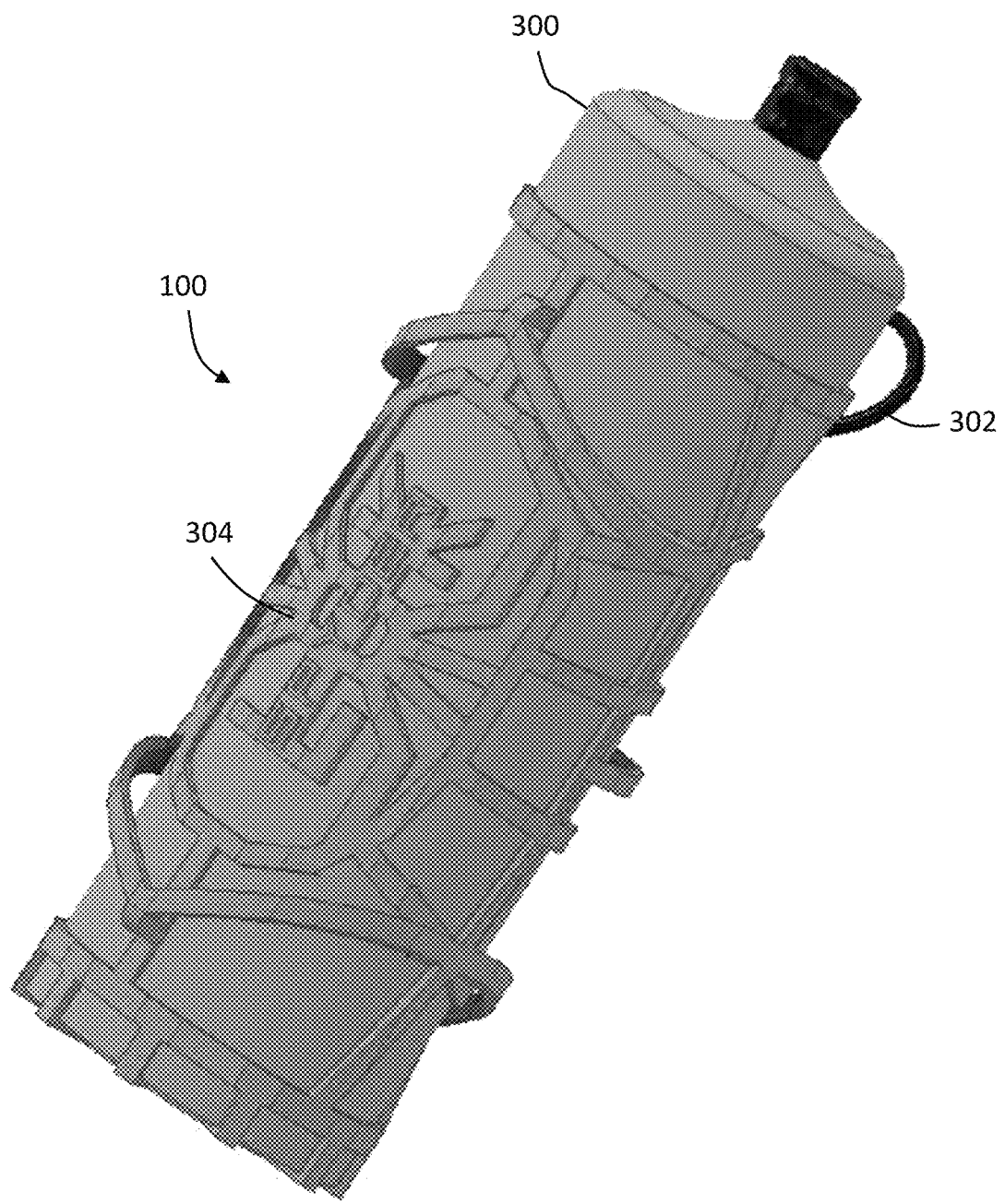
FIG. 9 is a perspective view of a sleeve for a water bottle in accordance with another embodiment.

Referring now to FIGS. 1-7, an embodiment of a sleeve 100 that is sized and shaped to receive a water bottle 300 (FIG. 9). The sleeve 100 includes a bottle holder portion 102, and one or more storage portions 104, 106, 108. In some embodiments, the bottle holder portion 102 may include a logo portion 110. The bottle holder portion 102 is defined by a first plurality of elastic straps 112a, 112b. The elastic straps 112a generally extend along the length of the bottle holder portion 102. The elastic straps 112b generally extend about the circumference of the bottle holder portion 102. It should be appreciated that while the elastic straps 112a, 112b are described as extending longitudinally or circumferentially, the straps may extend on angles relative to a longitudinal axis, or may be curved for example. Further, the elastic straps 112a, 112b may not extend the fully length or the entire circumference of the bottle holder portion 102, but may rather form segments that intersect with other segments. In an embodiment, the elastic straps 112a, 112b form a web of elastic straps.

The elastic straps 112a, 112b define a generally cylindrical interior portion 114 that is sized to receive a water bottle 300. In the illustrated embodiment, the elastic straps 112a, 112b are formed from an elastic material, such as silicone for example. It should be appreciated that the elasticity of the material allows a variety of sizes of water bottles to be inserted into the interior portion 114 and the elastic straps 112a, 112b will stretch to accommodate the The interior portion 114 has an open end 116 and an opposing second end 118. In an embodiment, the second end 118 is at least partially enclosed by a second plurality of elastic straps 120. In an embodiment, the second plurality of elastic straps 120 include a plurality of radial straps 122a and a circular strap 122b.

In an embodiment, the logo portion 110 may be part of the bottle holder portion 102. In an embodiment, the logo portion 110 may be formed by a plurality of elastic straps that are arranged or shaped to form a desired shape, such as an animal or a sports team logo for example. The elastic straps of the logo portion 110 may further define the interior portion 114.

In an embodiment, extending from the bottle holder portion 102 is a first storage portion 104. The storage portion 104 may includes a first elastic strap 124a adjacent the end 116 and a second elastic strap 124b adjacent the second send 118. The first elastic strap 124a may have a pair of sides 126a that angle/curve downward from a center portion 126b. The center portion 126b may be offset from the bottle holder portion 102 by a standoff strap 126c. The second elastic strap 124b may have a pair of sides 128a that angle/curve downward from a center portion 128b. The center portion 128b may be offset from the bottle holder portion 102 by a standoff strap 128c.

Figure 10:
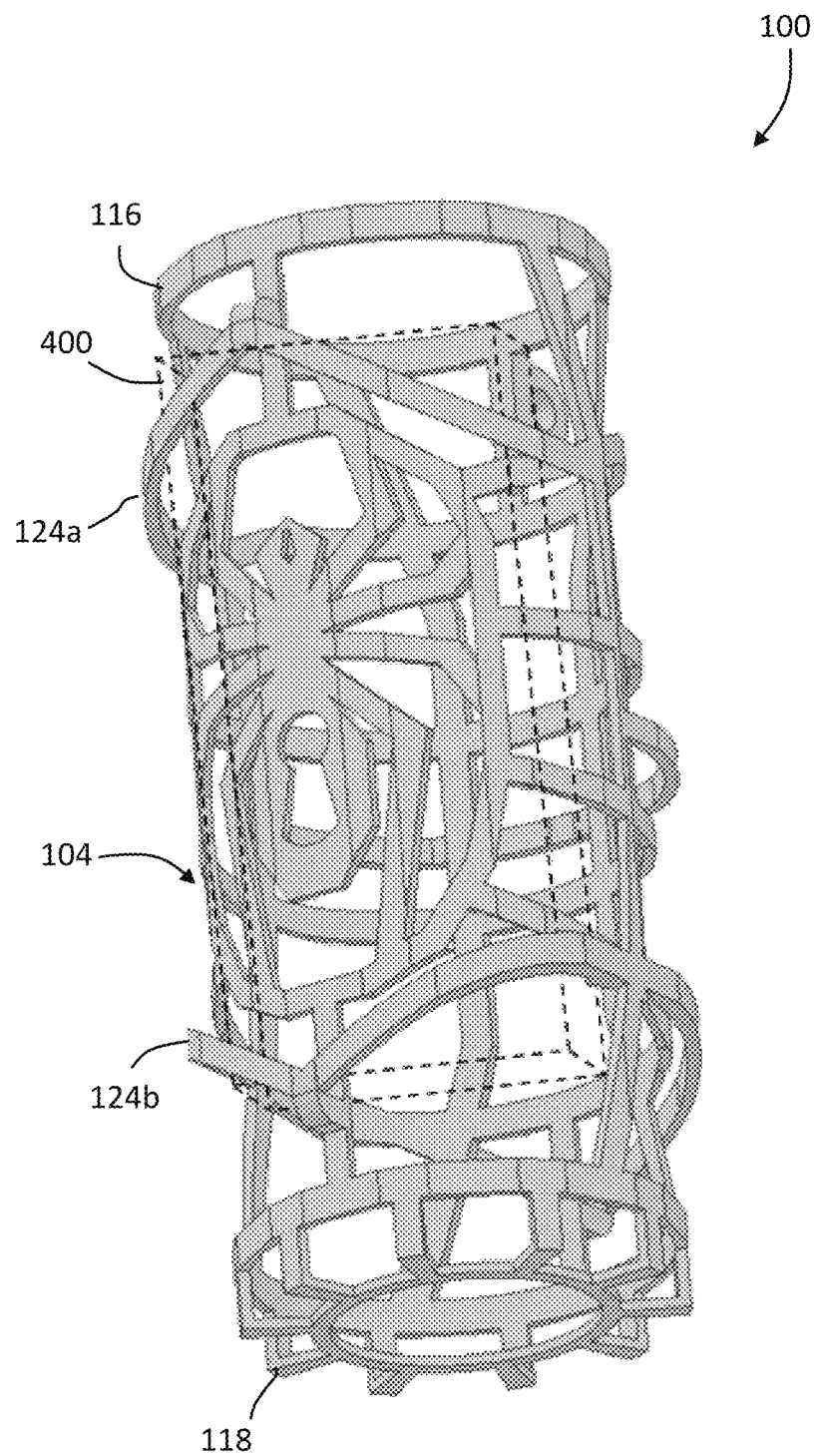
FIG. 10 is perspective view of the sleeve of FIG. 1 with a cell phone placed in a storage portion.

The first elastic strap 124a and the second elastic strap 124b define a volume that is sized to receive parallelepiped shaped object, such as a cellular telephone 400 (FIG. 10). In an embodiment, the corners of the cellular telephone are captured by the straps 126a, 128a to secure the cellular telephone to the sleeve 100. It should be appreciated that the center portion of the volume is open and accessible, allowing the user to interact with a touch screen interface of the cellular telephone.

In one or more embodiments the sleeve 100 may also include the second storage portion 106. In an embodiment, the second storage portion 106 includes a first elastic strap 130 (best seen in FIG. 4) adjacent the second end 118 and positioned opposite the strap 128a. The strap 130 may have a pair of sides 132a that angle/curve downward from a center portion 132b. In an embodiment, the center portion 132b may be offset from the bottle holder portion 102 by a standoff strap 132c. In an embodiment, the strap 130 is a mirror of the strap 124b. The second storage portion 106 defines a volume to receive an article, such as a wallet for example.

In one or more embodiments the sleeve 100 may also include the third storage portion 108. In an embodiment, the third storage portion 106 includes a first elastic strap 134 that is generally arranged midway between the first end 116 and the second end 118 opposite the logo portion 110. In an embodiment, the strap 134 has a semi-circular shape that extends from the bottle holder portion 102. In an embodiment, a center standoff portion may extend from the bottle holder portion 102 to support the center of the strap 134. In the illustrated embodiment, the center is unsupported and the strap 134 defines a volume for receiving an article, such as keys for example.

In an embodiment, the second storage portion 106 and the third storage portion cooperate to define a larger area for an article to be stored. In some embodiments, the length of the sleeve 100 is sized to allow articles to be stored beneath the water bottle 300. The articles may be held within the sleeve 100 by the elastic straps 122a, 122b.

In an embodiment, the sleeve 100 may further include a projection 138 that extends from the bottle holder portion 102. In an embodiment, the projection 138 includes a hole 140 that extends therethrough. The hole 140 is sized to receive an attachment device, such as but not limited to a ring 302, a clip, a strap, or a carabiner for example.

Figure 1:
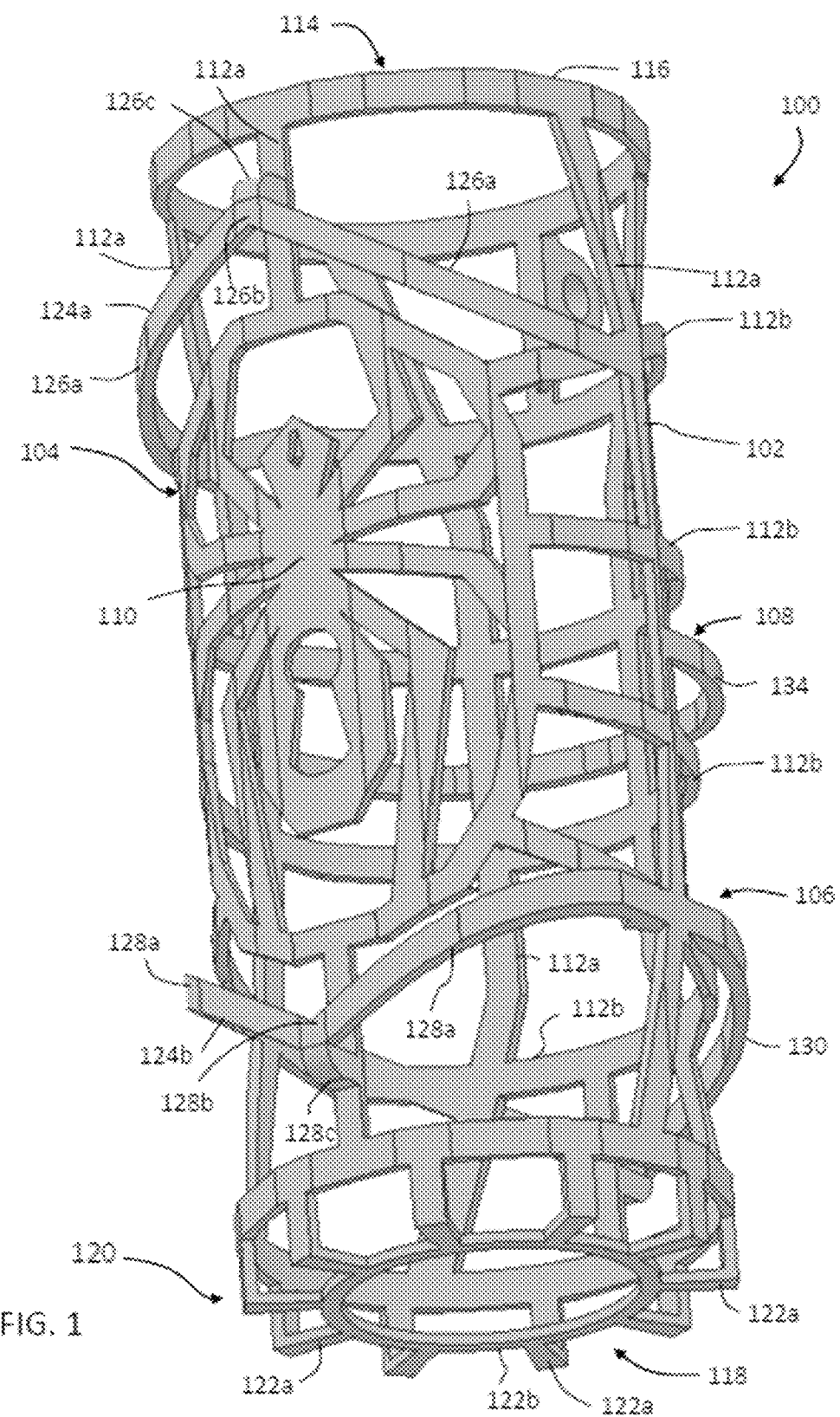
FIG. 1 is a perspective view of a sleeve for a water bottle in accordance with an embodiment.
Figure 2:
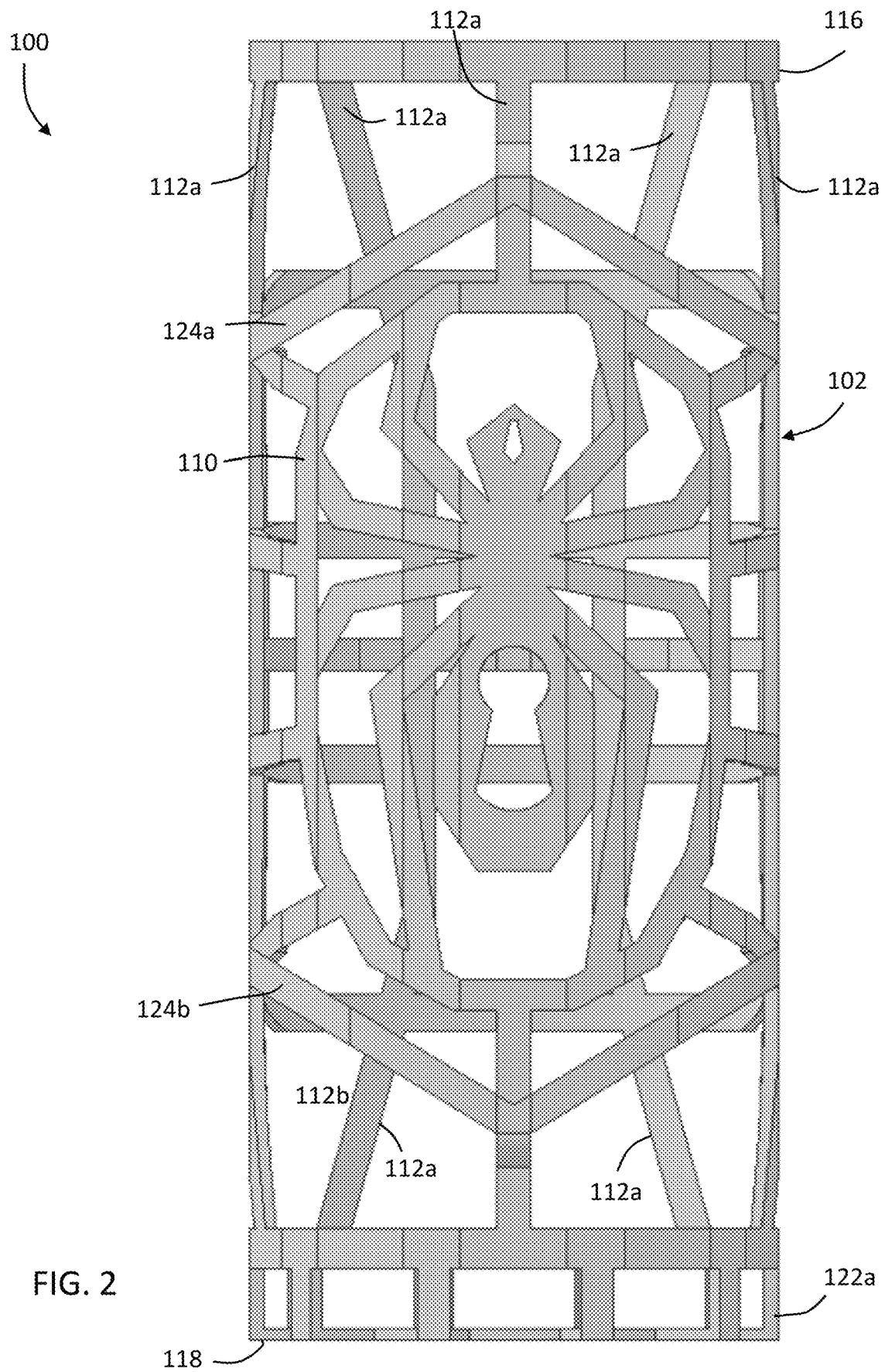
FIG. 2 is front view of the sleeve of FIG. 1.
Figure 3:
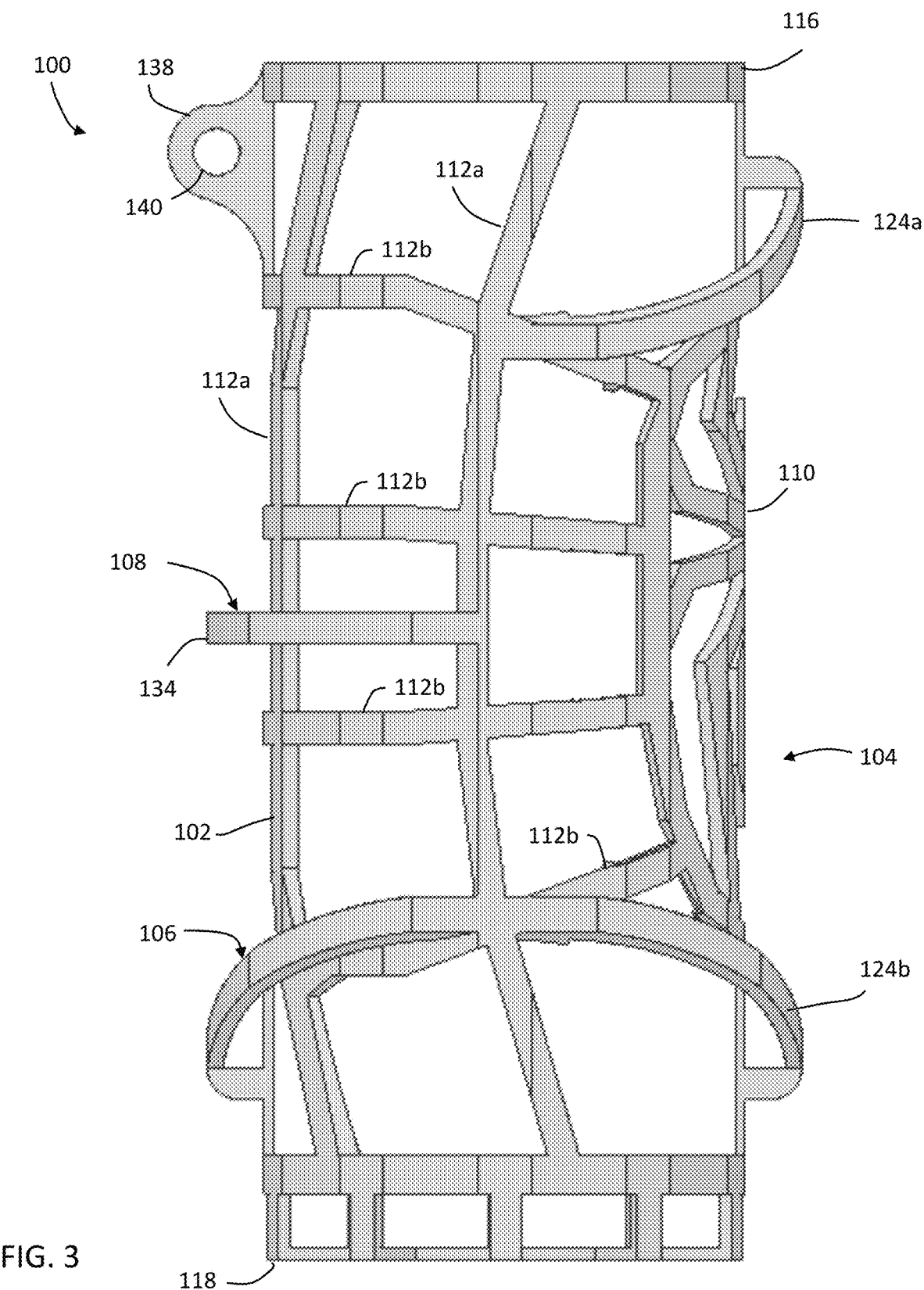
FIG. 3 is a first side view of the sleeve of FIG. 1.
Figure 4:
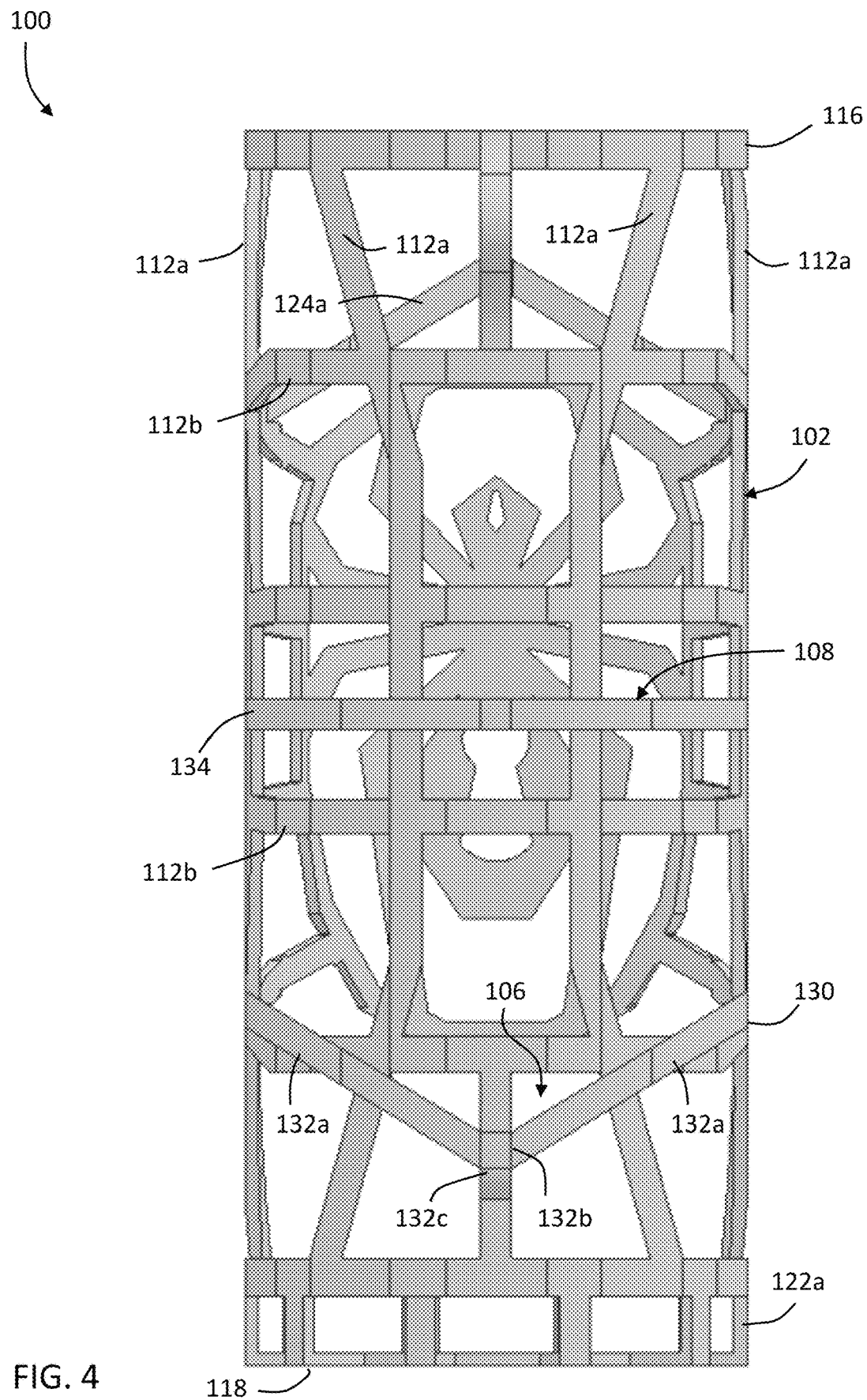
FIG. 4 is a rear view of the sleeve of FIG. 1.
Figure 5:
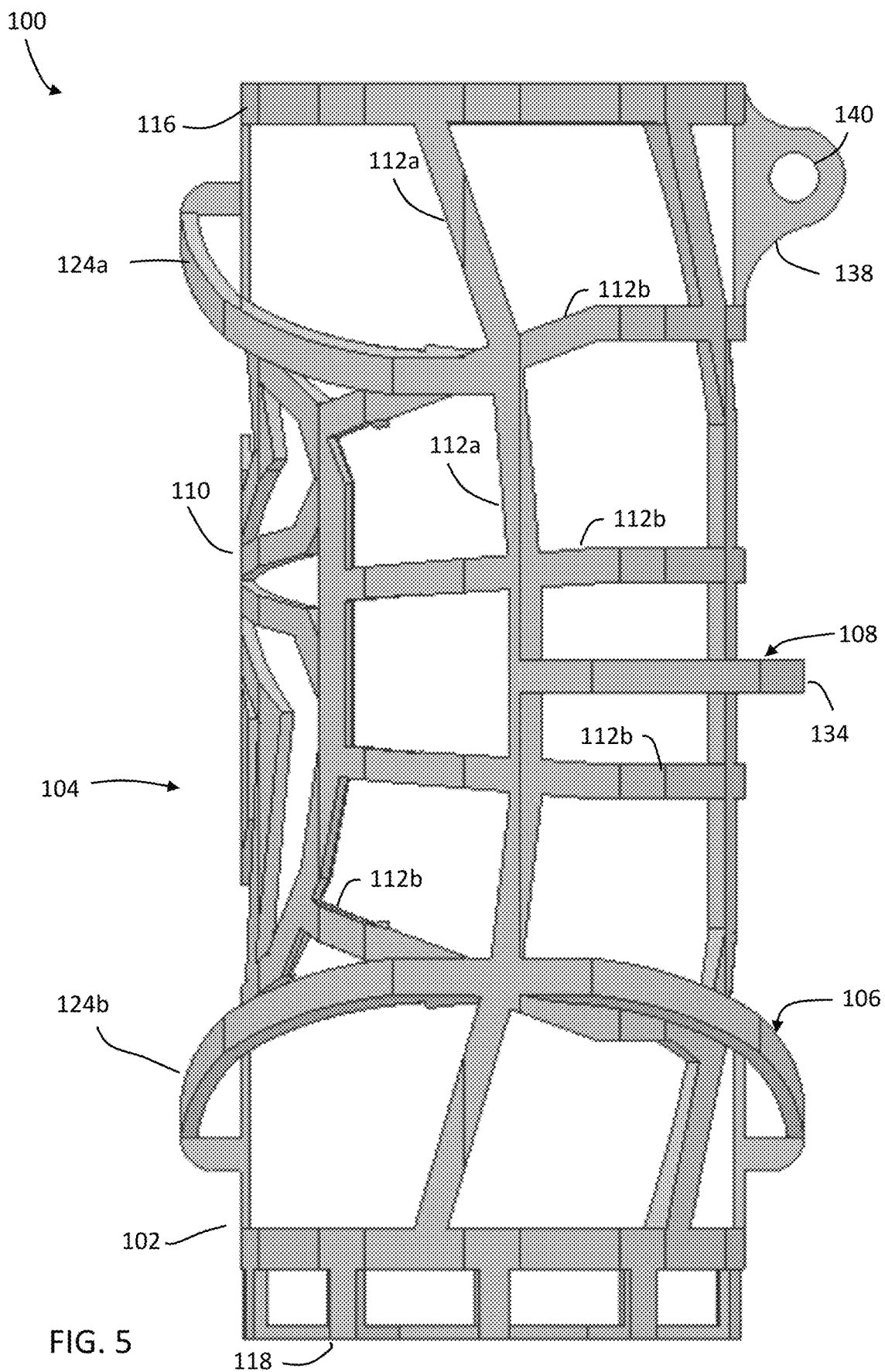
FIG. 5 is a second side view of the sleeve of FIG. 1.
Figure 6:
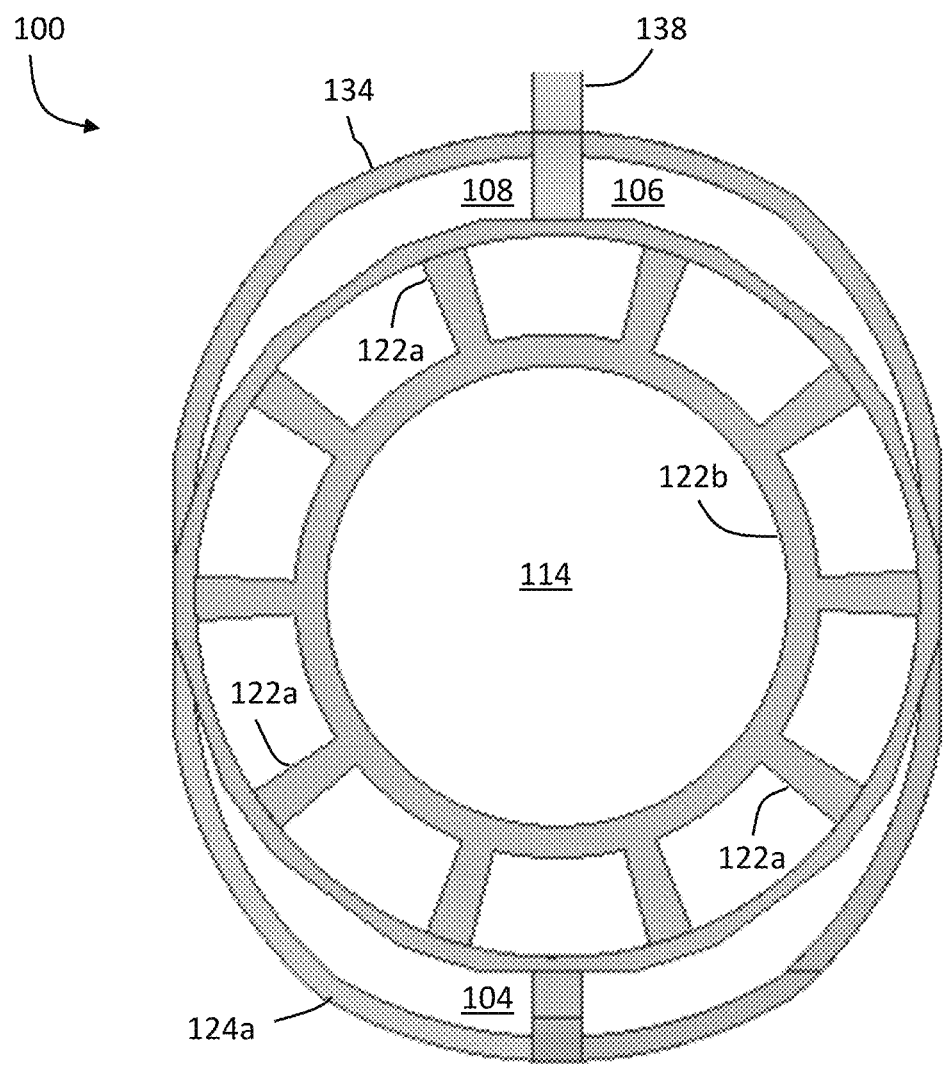
FIG. 6 is a first end view of the sleeve of FIG. 1.
Figure 7:
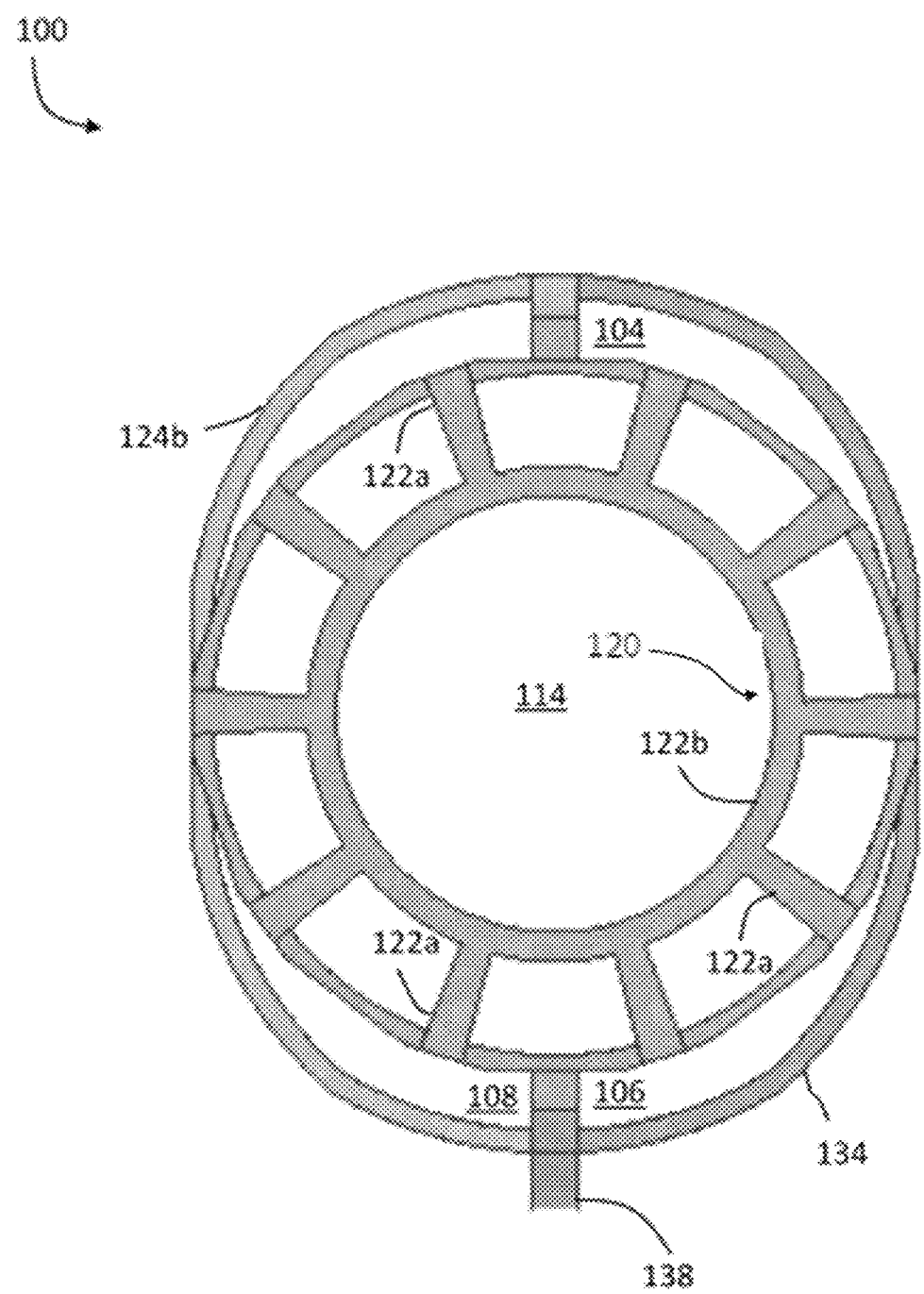
FIG. 7 is a second end view of the sleeve of FIG. 1.
Figure 8:
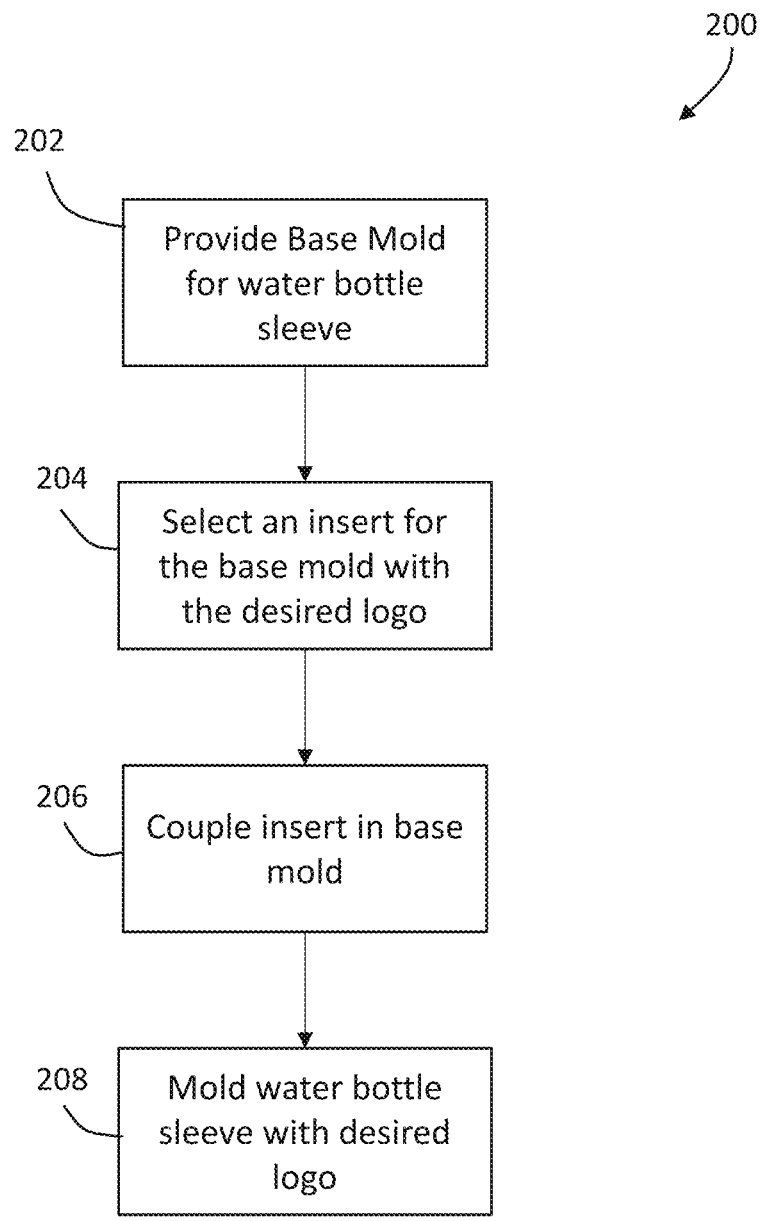
FIG. 8 is a flow diagram of a method of forming the sleeve of FIG. 1.

Referring now to FIG. 8 and embodiment is shown of a method 200 for producing the sleeve 100. It should be appreciated that it may be desirous to produce the sleeve 100 with the logo portion having different shapes while keeping the rest of the bottle holder portion 102 and the storage portions 104, 106, 108 substantially the same. The method 200 starts in block 202 where a base mold for the sleeve 100 is provided. The base mold is shaped to form the straps of the bottle holder portion 102 (except for the logo portion 110) and the storage portions 104, 106, 108. The method 200 then proceeds to block 204 where the operator selects an insert that cooperates with the base mold to define the shape of the logo portion 110. It should be appreciated that this allows for the operator to customize the sleeve 100 for different customers or different products. For example, the logo portion may form the shape 110 shown in FIG. 1 or the shape 304 shown in FIG. 9. It should be appreciated that while the illustrated embodiments show the logo portion as being in the shape of a spider, this is for example purposes and the claims should not be so limited. In other embodiments the logo portion may be shaped like an animal, a team mascot, a company name, or the like for example. The method 200 then proceeds to block 206 where the insert is removably coupled to the base mold and installed in the fabrication device, such as an injection mold. With the base mold and insert installed, the method 200 proceeds to block 208 where the sleeve 100 is fabricated with the desired logo shape.

It should be appreciated that while the embodiments herein may refer to the fabrication process as injection molding, this is for exemplary purposes and the claims should not be so limited. The method of fabrication may be performed by any known manufacturing process for silicone materials that allows for an removable insert or core. These processes may include transfer molding for example. In further embodiments, the sleeve 100 may be fabricated using an additive manufacturing process.

The term "about" is intended to include the degree of error associated with measurement of the particular quantity based upon the equipment available at the time of filing the application. For example, "about" can include a range of ±8% or 5%, or 2% of a given value.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection." It should also be noted that the terms "first", "second", "third", "upper", "lower", and the like may be used herein to modify various elements. These modifiers do not imply a spatial, sequential, or hierarchical order to the modified elements unless specifically stated.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A sleeve for a water bottle, the sleeve comprising:
   a bottle holder portion having a first plurality of elastic straps arranged to define a cylindrical center portion, the cylindrical portion having an open first end, and a second end at least partially enclosed by a second plurality of elastic straps, the open first end being sized to receive the water bottle; and
   at least one first storage portion having a third plurality of elastic straps, at least a portion of the third plurality of elastic straps extending from the first plurality of elastic straps.

2. The sleeve of claim 1, further comprising at least one second storage portion having a fourth plurality of elastic straps, at least a portion of the fourth plurality of elastic straps extending from the first plurality of elastic straps.

3. The sleeve of claim 2, wherein the second storage portion is sized to receive a wallet.

4. The sleeve of claim 2, first comprising at least one third storage portion, the at least one third storage portion having an elastic strap extending from the first plurality of elastic straps.

5. The sleeve of claim 4, wherein the at least one third storage portion is positioned adjacent the at least one second storage portion.

6. The sleeve of claim 1, wherein the bottle holder portion include a logo portion, the logo portion having a fifth plurality of elastic straps, the fifth plurality of elastic straps forming a predefined shape.

7. The sleeve of claim 6, wherein the logo portion is positioned adjacent the first storage portion.

8. The sleeve of claim 1, wherein the first plurality of elastic straps, the second plurality of elastic straps and the third plurality of straps are made from a silicone material.

9. The sleeve of claim 1, wherein the first storage portion is sized to receive a cellular telephone.

10. The sleeve of claim 1, further comprising a projection extending from the first plurality of elastic straps adjacent to the first end, the projection having a hole extending therethrough.

11. The sleeve of claim 10, further comprising an attachment device removably coupled to the projection through the opening, the attachment device being one of a strap, a clip, a ring, or a carabiner.

12. A method of making a sleeve for a water bottle, the method comprising:
    providing a base mold for an injection molding machines, the base mold being shaped to form a bottle holder portion and at least one first storage portion, the bottle holder portion having a first plurality of elastic straps arranged to define a cylindrical center portion, the cylindrical portion having an open first end, and a second end at least partially enclosed by a second plurality of elastic straps, the open first end being sized to receive the water bottle, and the at least one first storage portion having a third plurality of elastic straps, at least a portion of the third plurality of elastic straps extending from the first plurality of elastic straps;
    selecting from a plurality of inserts a first insert configured to removably couple with the base mold, the first insert being shaped to form a logo portion in the bottle holder portion;
    inserting the first insert into the base mold; and
    forming the sleeve using the base mold and the first insert.

13. The method of claim 12, wherein the sleeve is formed from a silicon material.

14. The method of claim 12, wherein the logo portion is in a shape of an animal.

15. The method of claim 14, wherein the at least one first storage portion is sized to receive a cellular telephone.

16. The method of claim 12, wherein the base mold is further shaped to form at least one second storage portion having a fourth plurality of elastic straps, at least a portion of the fourth plurality of elastic straps extending from the first plurality of elastic straps.

17. The method of claim 16, wherein the at least one second storage portion is sized to receive a wallet.

18. The method of claim 16, wherein the base mold is further shaped to form at least one third storage portion, the at least one third storage portion having an elastic strap extending from the first plurality of elastic straps.

* * * * *